United States Patent
Kenny et al.

(10) Patent No.: US 7,038,437 B2
(45) Date of Patent: May 2, 2006

(54) PROGRAMMABLE POWER SUPPLY HAVING DIGITALLY IMPLEMENTED SLEW RATE CONTROLLER

(75) Inventors: John Kenny, Califon, NJ (US); Michael Joseph Benes, Irvington, NJ (US); Marko Vulovic, Wharton, NJ (US)

(73) Assignee: Agilent Technologies, Inc., Palo Alto, CA (US)

( * ) Notice: Subject to any disclaimer, the term of this patent is extended or adjusted under 35 U.S.C. 154(b) by 33 days.

(21) Appl. No.: 10/748,043

(22) Filed: Dec. 31, 2003

(65) Prior Publication Data
US 2005/0146312 A1 Jul. 7, 2005

(51) Int. Cl.
*G05F 1/40* (2006.01)
(52) U.S. Cl. ....................................................... 323/283
(58) Field of Classification Search ................ 323/283, 323/284
See application file for complete search history.

(56) References Cited

U.S. PATENT DOCUMENTS 4,743,815 A * 5/1988 Gee et al. .................... 318/254

* cited by examiner

*Primary Examiner*—Shawn Riley

(57) ABSTRACT

A digitally implemented slew rate controller for a power supply and a power supply having the same. An output up-programming signal is provided that enables the power supply to change an output voltage and current at a maximum rate which does not engage the protection circuits which are employed to protect components of the power supply. The maximum rate of change decreases as the output voltage increases. The up-programming speed of the power supply output optimizes the output by considering that an amount of output current available for charging an output capacitor of the power supply will decrease as the output voltage increases for a resistive load. An output down-programming control signal enables a discharge device to dissipate heat with a constant power characteristic, which will minimize a time required to reduce the output voltage while not exceeding a maximum power dissipation rating of the discharge device.

20 Claims, 5 Drawing Sheets

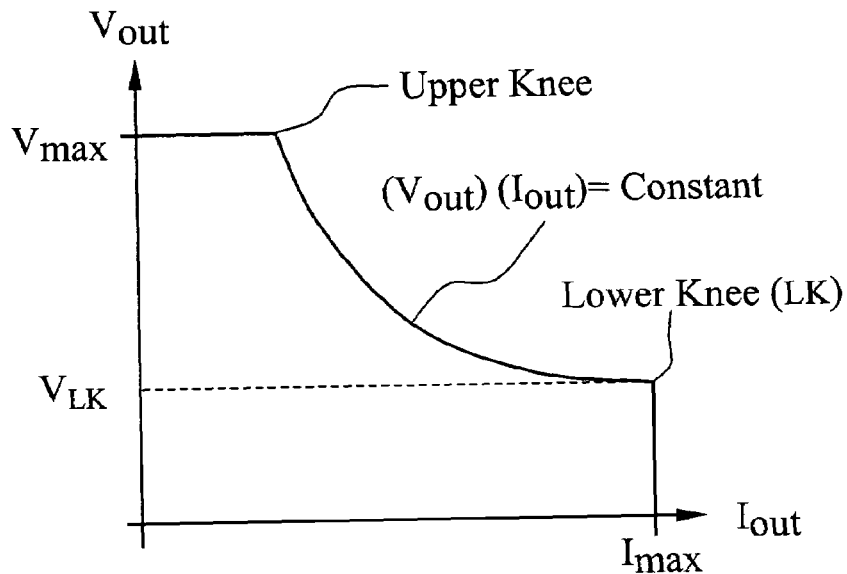
FIG. 3
FIG. 4
FIG. 5
$V(t) = V_S + (V_F - V_S)(1 - e^{-t/\tau_1})$
FIG. 6
$V(t) = V_S + (\frac{V_F^2}{V_{LK}} - V_S)(1 - e^{-t/\tau_2})$
FIG. 7
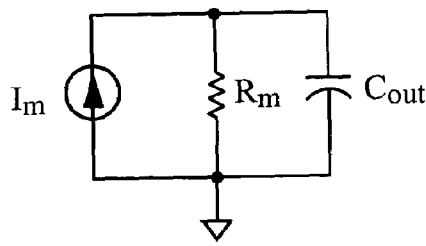
FIG. 8
$\tau_1 = V_F * C_{out}/I_{max}$
FIG. 9
$\tau_2 = V_F^2 * C_{out}/P_{outmax}$
FIG. 10
$\tau_3 = V_F^2 * C_{out}/(2*P_{outmax})$
FIG. 11
$V(t) = \sqrt{(V_i^2 - 2P_m*t/C_{out})}$
FIG. 7 (bottom)
$V(t) = \sqrt{V_S^2 + (V_F^2 - V_S^2)(1 - e^{-t/\tau_3})}$

PROGRAMMABLE POWER SUPPLY HAVING DIGITALLY IMPLEMENTED SLEW RATE CONTROLLER

CROSS-REFERENCE TO RELATED APPLICATIONS

Not Applicable

BACKGROUND OF THE INVENTION

1. Field of the Invention

The present invention relates to a power supply having a digitally implemented slew rate controller, and more particularly to a power supply having a digitally implemented slew rate controller which optimizes up and down programming speed in programmable power supplies while minimizing overshoots.

2. Description of the Related Art

Power supplies are a useful tool for performing system tests of electronic devices during manufacture of the devices and test system throughput is a critical factor in controlling manufacturing overhead. Cost of test is increasing as products become more sophisticated, requiring more complicated tests. Power supplies are a part of a minimum set of test apparatus connected during any system test and are a significant part of total system throughput.

System power supplies are required to change output state quickly to maximize system throughput. A system power supply should settle to a new final value in a minimum time, without undershooting or overshooting the final value. The system power supply should also change in a controlled manner, i.e., without excessive slew rate or changes in direction.

Power supplies must provide both static load current and dynamic capacitor charging current. A typical power supply has an output capacitor to stabilize an output voltage thereof and to provide a low output impedance at high frequencies greater than a unity gain bandwidth of the feedback systems of the power supply. The low output impedance minimizes disturbances on the output caused by high frequency pulsations of the load during normal operation. Power supplies also typically have additional load capacitors to further stabilize a voltage at a load.

A typical power supply has a practical limit of an amount of instantaneous power and current that the power supply can deliver to the load. The current and power limit is a determining factor in a size and cost of the power supply. If the limiting current capacity is exceeded by trying to force the power supply to change faster than the combined charging current of the output capacitor and the load current, the power supply will cease to be regulated by feedback systems, resulting in an occurrence of overshoots or undershoots and causing test errors in a production test system. Many loads are extremely sensitive to excessive voltage excursions, causing testing errors and possible device damage.

A typical application for system power supplies may need multiple different levels of voltage and current to provide power to a device under test (DUT). An auto-ranging power supply may be designed to provide more current at lower output voltages, and less current at higher output voltages, while minimizing the size of the power supply.

The auto-ranging power supply provides a different level of excess current depending on an instantaneous value of the output voltage. In order to provide a maximum rate of change of voltage for such a power supply, the slew rate of the power supply must change and decrease as the power supply voltage is increased, effectively reducing the level of output current required to slew any output capacitance connected to output terminals of the power supply which deliver the output voltage to the load as well as any internal output capacitance included in the design of the power supply.

In auto-ranging power supplies, an amount of excess current available to cause the output to change voltage is a function of the load current, the present output voltage and the current rating of the power supply at each operating point.

Switching power supplies must limit the maximum amount of current drawn to protect the components in the power supply from failure. Protection circuits are normally used to limit the maximum amount of current drawn by the power supply. If the protection circuits engage during normal output transitions, the protection circuits may cause overshoots or undershoots in the output when the protection circuits disengage. It is therefore desirable to cause the output of the power supply to increase during a programming increase at a rate that will draw the maximum amount of current that will not engage the protection circuits.

Auto-ranging power supplies, i.e., power supplies that provide an output current that increases as the output voltage decreases, require a dynamically varying level of current limiting as the output voltage increases in order to protect the switching components.

In order to rapidly reduce the voltage of a switching power supply, discharging the output capacitors of the power supply is necessary. The discharge of the output capacitors creates heat in at least one component within the power supply. A maximum discharge of the power supply is accomplished by maximizing the amount of heat generated within the limits of the available heat sinking capability of the down programming circuit at all output voltages. The operating locus that causes the maximum power at all operating points, and thus the minimum down programming time for an output discharge sequence is a constant power curve.

A system power supply is typically controlled by a Digital to Analog Converter (DAC) which is under computer control and has an output directly proportional to the output voltage up to a predetermined bandwidth limit.

Conventional circuits for optimizing programming speed of a power supply are well known. These devices include circuits for slew rate control, single stage RC low pass filter circuits, dual rate RC low pass filter circuits and overshoot control circuits.

In conventional slew rate control circuits, a constant slope is created on the programming voltage to the power supply. Slew rate control circuits have been implemented in a variety of ways, including digital and analog circuits. Although slew rate control circuits are relatively easy to implement, known implementations do not provide a optimum rate of change at all operating points.

In a conventional single stage RC low pass filter circuit, a single pole low pass filter is placed on a programming input signal to the power supply. Single stage RC low pass filter circuits are typically a lowest cost solution, however the single stage low pass filter circuit is independent of the absolute voltage and is determined solely by the change in voltage. Since a slope of the voltage change does not change with operating point, slower transitions to control the maximum slew rate to prevent overshoots from occurring are a result.

In a conventional dual rate RC low pass filter circuit, an absolute voltage and a relative voltage are used to switch in a slower time constant to try to optimize the slew rate. While the dual rate RC low pass filter circuit has superior output speed compared with the single stage RC low pass filter circuit, the dual rate RC low pass filter circuit is substantially more complex and costly, since the parts used are in the programming path and must be high precision to control accuracy of the voltage programming system.

In conventional overshoot control circuits, power and current limit circuits are used to determine a level of current and rate of change of the output voltage and current. Additional circuits are added that try to minimize or eliminate the overshoots that may occur when a main voltage control loop is out of regulation and control during transient conditions of overshoot. The overshoot control circuits are difficult to design for proper operation without causing instabilities and minimal overshoots over a wide set of output voltage and current operating points. The conventional overshoot control circuit has a benefit of providing a maximum slew rate, however the current or power limit circuit would need to be designed to provide a maximum amount of safe current at all operating points.

SUMMARY OF THE INVENTION

The present invention provides an output up-programming signal to the power supply that changes the power supply output voltage and current at a maximum rate which does not engage the protection circuits which are employed to protect components of the power supply. For an auto-ranging power mesh a maximum rate of change depends on the output voltage, decreasing as the output voltage increases. The up-programming speed of the power supply output is optimized by considering that the amount of output current available for charging the output capacitor will decrease linearly as the output voltage increases for a resistive load. An output down-programming control signal is provided that causes heat in a discharge device to reflect a constant power characteristic, which will minimize the time required to reduce the output voltage.

In an embodiment of the invention, a digital state machine controls a digital to analog converter (DAC) connected to a power supply control input. A continuous stream of values is written to the DAC to maximize the rate at which the output is changing at any operating point to a value that would cause the power supply to draw the maximum current and/or power that the power supply can supply at that operating point without causing the current or power limit circuits to be engaged. The voltage feedback loop is always controlling the power supply output, obviating a need for any overshoot control circuits.

The slew control system uses a lookup table of voltage offsets that are added to the present value of the DAC to cause the DAC to change to a new value. The lookup table has an input pointer that is made of both the present value of the DAC and the final value of the DAC. This pointer indexes into the lookup table of offsets and an indicated offset is fed to an accumulator, which then computes a next value by combining the offset with the present value of the DAC. Before the DAC is actually updated, the new computed value is compared to the final value of the DAC. If the new computed value would cause the DAC output to exceed the final value, the final value is written to the DAC. If the DAC present value is equal to the final value, the DAC value will not change. The system is a synchronously clocked system, thus, a given voltage offset added to the DAC per unit time effectively controls the slope or rate of change of the DAC. The system is run at a high clock rate relative to the slope of the DAC allowing a small RC filter to smooth the small steps on the output of the DAC as it is updated.

The amount of excess current available to charge and discharge the output capacitor may be very different during positive transitions versus negative transitions. For example, in a normal two-quadrant system power supply, a level of excess positive current available is determined by the size of the components used in the forward power transfer system, while an amount of excess current available to discharge the output capacitor is limited by the down programming subsystem. The different characteristics may require very different slopes for the up and down slew rates, with different values of slope at every operating point. By making the look-up table sensitive to the direction of change, as well as the absolute operating point, a power supply system may be extended to support optimum slew rate control for both the up and down directions.

The cost of the digital logic required to implement a system according to the present invention is quite low, and continues to drop and a high speed DAC required is also low in cost. A DAC is necessary to allow the digital subsystem to control the output, a requirement of any system programmable power supply. The DAC must be a higher speed capable part to allow the transitions to be satisfactorily controlled, but a higher speed DAC has a minimal impact on the cost for a precision system power supply.

A further advantage of the present invention is realized for applications that are sensitive to the maximum rate of change of the power supply output. In these cases, the look-up table may be modified to allow the slope of the output to be controlled at slower rates than the maximum for optimum transitions. By making the table RAM based, user access can be provided to allow unique transition characteristics to be created to meet the complex needs of end users, without any hardware changes being required. These changes can be generated at digital logic speeds.

Control of maximum slew rate is provided by limiting or "clipping" the maximum offset added to the DAC on each step. Additional segments of the table may be engaged when the power supply is switched to different ranges, effectively scaling the slope to compensate for different gains from the programming port to the output. The table is corrected to compensate for any inherent slew limiting in the voltage control subsystem, correcting for and further limiting the output transitions in view of a non-ideal voltage loop bandwidth.

DETAILED DESCRIPTION OF THE INVENTION

The present invention will become more apparent and more readily appreciated from the following description of the various embodiments, taken in conjunction with the accompanying drawings in which:

FIG. 3 is a graphic representation of a power curve used for calculating slew rates of the power supply shown in FIG. 1;

FIG. 4 is an equation defining a voltage that describes the output voltage when the starting and finishing voltages are both below the lower knee voltage, $V_{LK}$, shown in FIG. 3;

FIG. 5 is an equation defining a voltage that describes the output voltage when the present voltage is below the lower knee voltage, $V_{LK}$, shown in FIG. 3, and the final voltage, $V_F$, is greater than the lower knee voltage, $V_{LK}$ shown in FIG. 3;

FIG. 6 is an equation defining a voltage that describes the output voltage when the present voltage is above the lower knee voltage, $V_{LK}$, shown in FIG. 3, and the final voltage, $V_F$, is greater than the lower knee voltage, $V_{LK}$ shown in FIG. 3;

FIG. 7 is a simplified schematic diagram for explaining an operation of the power supply shown in FIG. 1;

FIG. 8 is an expression defining a time constant in the equation shown in FIG. 4;

FIG. 9 is an expression defining a time constant in the equation shown in FIG. 5;

FIG. 10 is an expression defining a time constant in the equation shown in FIG. 6;

FIG. 11 is an equation for explaining down programming of the power supply shown in FIG. 1;

Figure 1:
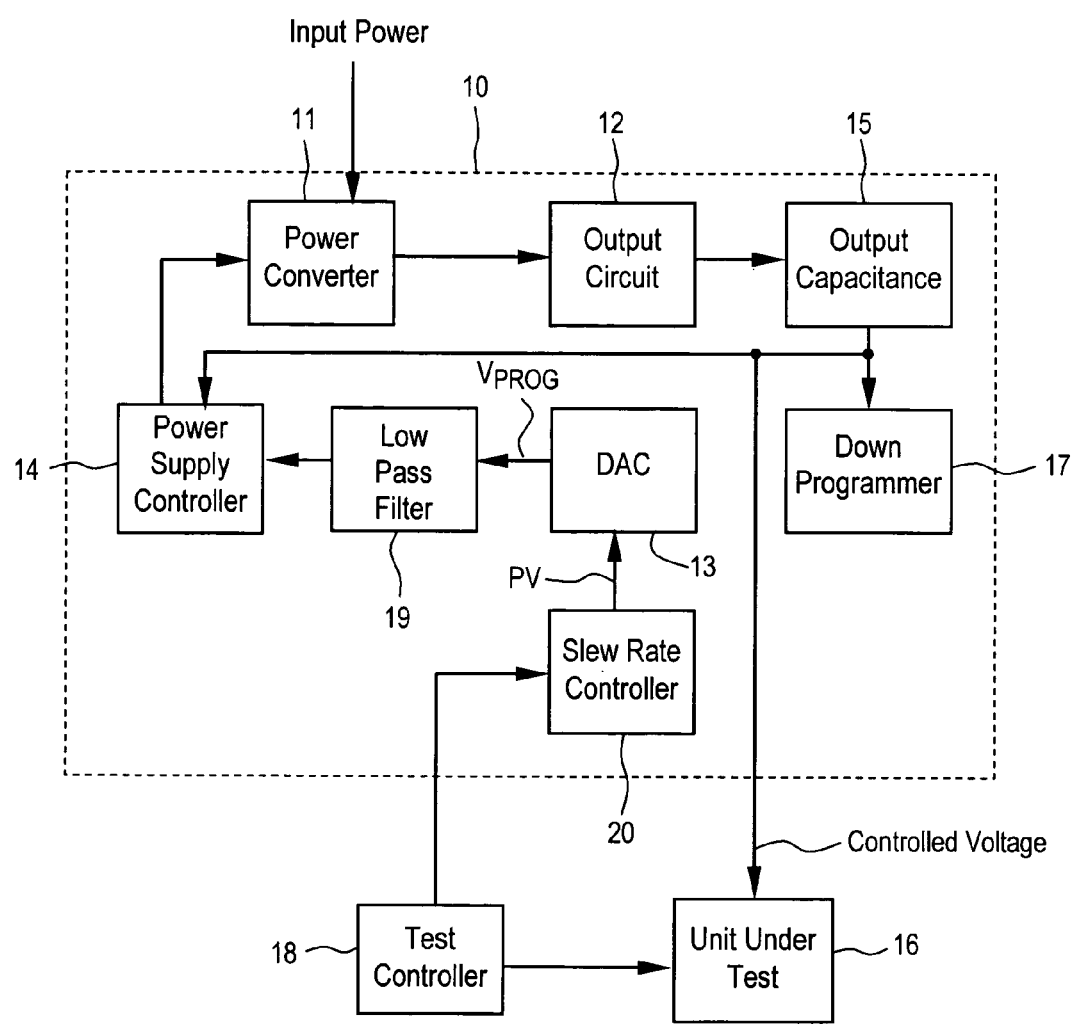
FIG. 1 is a block diagram of an embodiment of a power supply of the present invention.

Reference will now be made in detail to the present invention, examples of which are illustrated in the accompanying drawings, wherein like reference numerals refer to the like elements throughout. The embodiments are described below in order to explain the present invention by referring to the figures.

Referring now to FIG. 1, a power supply 10 according to the present invention comprises a power converter 11, an output circuit 12, a power supply controller 14, a digital to analog converter (DAC) 14; a slew rate controller 20; an output capacitance 15; a down programmer 17; and a low pass filter 19. In a typical test set up using the power supply 10, the power supply 10 provides a controlled voltage or power to a unit under test 16 in response to inputs from a test controller 18, such as for example, a digital computer. Where a maximum rate of change of the output voltage is desired, the slew rate controller 20 controls the DAC 14 to write a continuous stream of values to the DAC 14 to maximize the rate at which the output (Controlled Power) is changed at any operating point to a value which causes the power supply to draw a maximum current and/or power at that operating point without causing the current or power limit circuits to be engaged. Where a rate less than the maximum rate of change output voltage is desired, the slew rate controller 20 controls the DAC 14 to write a continuous stream of values to the DAC 14 to control the rate at which the output is changed.

Figure 2:
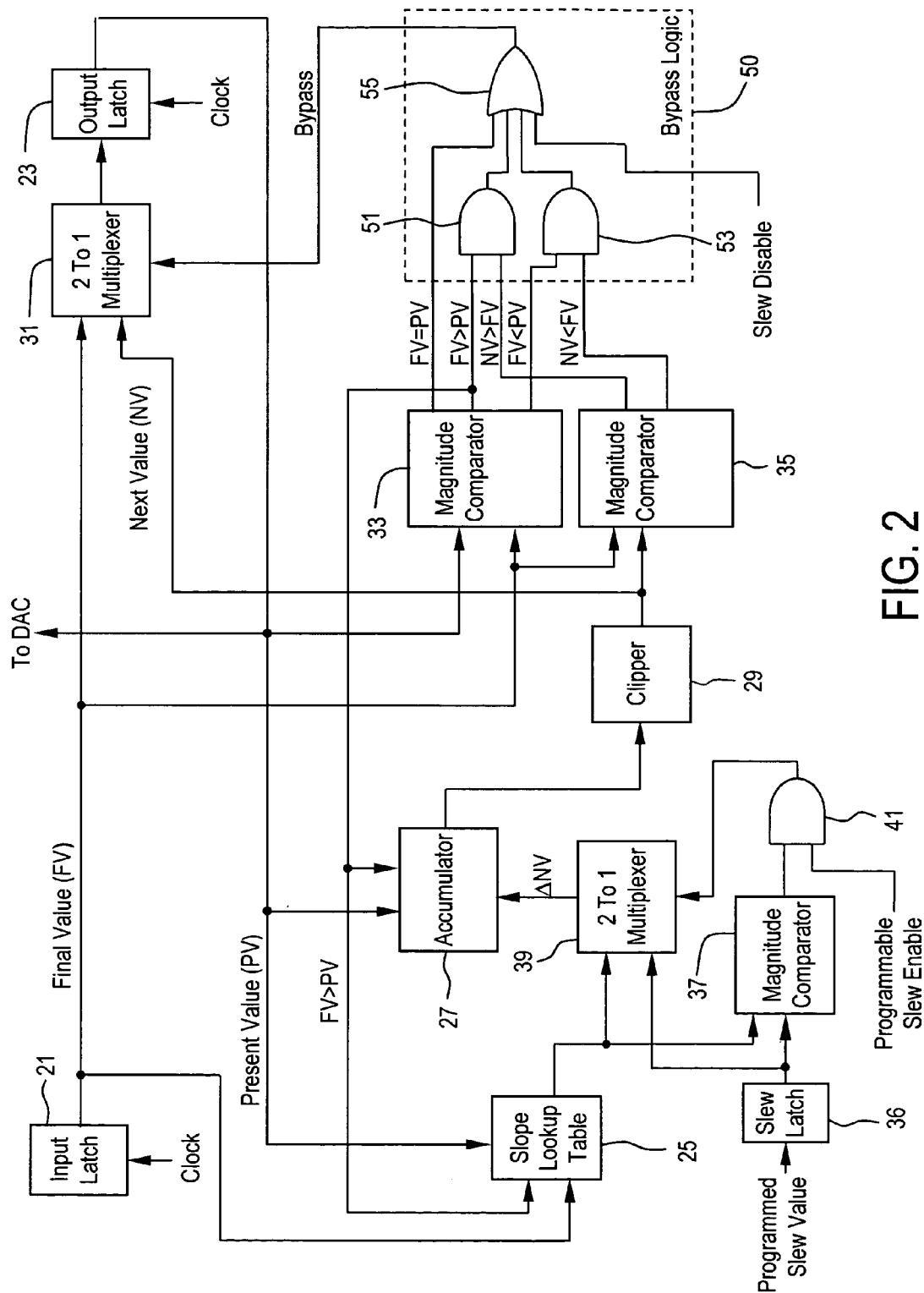
FIG. 2 is a block diagram of the slew rate controller shown in FIG. 1.

Referring now to FIG. 2, an embodiment of the slew rate controller 20 according to the present invention, comprises an input latch 21, an output latch 23, a slope lookup table 25, an accumulator 27, a clipper 29, a first multiplexer 31, a first magnitude comparator 33, a second magnitude comparator 35, a slew latch 36, a third magnitude comparator 37, a second multiplexer 39, an AND gate 41, and a bypass logic circuit 50.

The input latch 21 receives an input command from the test controller 18 requesting that the power supply output a final value (FV) and updates to store the requested final value (FV) at a clock edge of an input clock signal output by the test controller 18. The output latch 23 also updates on the clock edge of the input clock signal and presents a present value (PV) to the DAC 13. The slope look up table 25 stores incremental changes to be transferred to the DAC 13 and is indexed by present value (PV), final value (FV) and a direction, the direction being indicated by a state of a flag (indicated as FV>PV) at an output of the magnitude comparator 33.

The accumulator 27 adds an offset value ΔNV to the present value (PV) to create a next value (NV). When the final value (FV) is not greater than the present value (PV) as indicated by the state of the FV>PV flag of the magnitude comparator 33, the offset value ΔNV is subtracted from the present value (PV) causing the next value (NV) to be less than the present value (PV), thus causing the output to the DAC 13 to decrease. The clipper 29 limits the next value (NV) to be within a range of a maximum and a minimum value in order to prevent a "wraparound" effect in the DAC 13. The "wraparound" effect occurs if the digital value goes above or below the limits of the bit size of the DAC 13.

The 2 to 1 multiplexer 31 selects one of the final value (FV) and the next value (NV) based on a bypass signal (BP) generated by the bypass logic circuit 50. The bypass logic circuit 50 comprises AND gates 51 and 53 and an OR gate 55.

The magnitude comparator 33 compares the final value (FV) and the present value (PV) and generates three signals, FV=PV, FV>PV and FV<PV. The magnitude comparator 35 compares the next value (NV) and the final value (FV) and generates two signals, NV>FV and NV<FV.

The bypass logic circuit 50 uses the signals FV=PV, FV>PV, FV<PV, NV>FV and NV<FV to stop the stewing of the power supply output by outputting the bypass signal (BP) to the multiplexer 31. The logic in the bypass logic circuit 50 provides two possible cases of slewing complete.

The first case is where FV>PV, which means that the output is slewing up in value, and NV>FV and logic thereof is provided by the AND gate 51. That is, if the present value (PV) were to assume the next value (NV), the output would exceed the desired final value FV. Thus, bypass is asserted by the logic circuit 50 and output through the OR gate 55 to stop the slewing.

The second case is where FV<PV, which means that the output is slewing down in value, and NV<FV and logic thereof is provided by the AND gate 53. That is, if the present value (PV) were to assume the next value (NV), the output would be less than the desired final value (FV). Thus, bypass is asserted by the logic circuit 50 and output through the OR gate 55 to stop the slewing.

Also, if PV=FV, bypass is also asserted by the logic circuit 50 and output through the OR gate 55 because no remaining slewing is required. Finally, if it is desired to turn off the slewing and cause the output to immediately assume the final value (FV), an additional signal, Slew Disable may be input to bypass logic circuit 50 and output through the OR gate 55 to allow the bypass signal (BP) to be forced true, thus causing the present value (PV) to immediately assume the final value (FV).

The slew latch 36 updates on the clock edge output by the controller 14 and stores a requested slew rate. The maximum slew rates in the positive and negative directions may be the same or the slew rates in the positive and negative directions may be asymmetrical.

The magnitude comparator 37 compares an output value from the slope lookup table 25, which stores normal maximized slew rates for maximum programming speed, and the user programmed slew rate latched in the slew latch 36. If the user programmable maximum slew rate latched in the slew latch 36 is slower than the look up value, the magnitude comparator 37 outputs a signal to the AND gate 41 and if the programmable slew rate is enabled by another signal to the AND gate 41, the multiplexer 39 substitutes the lower rate to the accumulator 27. Thus, the offset signal ΔNV input to the accumulator 27 is one of the output of the lookup table 25 and the slew latch 36. That is, the multiplexer 39 selects between two possible slew rate offsets based on the output of the magnitude comparator and the Programmable Slew Enable signal.

The slew rate controller 20 controls the value output to the DAC 13 by adding offsets at a fixed clock period. With an appropriately high update rate and an appropriately small bit weight, a very accurate approximation of a controlled slope is simulated.

In an integer based system, bit resolution limits a minimum resolution of slew rate. In order to enable greater resolution dynamic range, some of the functions may be extended to have fractional bit weights, that is, to store or process a higher number of bits during processing. However, only the high order bits are presented to the DAC 13. Presenting only the higher order blocks causes the behavior of the slew controller to change in that the DAC 13 may not change on every clock period. For example, if the slew offset is 1 count and there are 8 fractional bits "below" the binary point, it would take 256 clock cycles between DAC updates. The extended function feature extends the dynamic range of the converter, and further extends the applicability of a power supply comprising the slew rate controller 20.

Values stored in the slope lookup table 25 are chosen to optimize the up and down programming speed while preserving a limitation that a total current of the power converter 11 or the output circuit 12 does not exceed maximum power capabilities. For up programming, values may be calculated in two sections. A first section takes advantage of an excess current available when a resistive load is below a maximum load current of the load at the lower knee of the constant power output boundary, (see FIG. 3) making programming below the lower power boundary extremely fast compared to normal constant slope or exponential "RC based" slew control. A first equation, shown in FIG. 4, reflecting a maximum slew rate is used to derive the slew rates for the first section. In a second section used when the final value of the output voltage is above the lower knee of the constant power boundary, two equations that express the maximum slew rate as a function of the present value (PV) and the final value (FV) are used to create slew offsets for operation above the lower knee. See FIGS. 5 and 6. FIG. 5 is to be used when the present value of the output voltage is below the lower knee voltage $V_{LK}$. FIG. 6 is to be used when the present value of the output voltage is above the lower knee voltage $V_{LK}$. By keeping the total power below the maximum power limit, the output stays in constant voltage regulation, preventing overshoots from mode changes if the power limit circuits were to engage.

For slewing in the down direction, the values in the slew table may be selected to control a maximum power dissipation in the down programmer 17, which is a dissipative circuit that discharges the output capacitance 15 of the power converter 11 or the output circuit 12. By keeping the power in the down programmer 17 below the maximum limit of the down programmer 17, the output stays in constant voltage regulation, preventing overshoots from mode changes if the power limit circuits were to engage.

A maximum slope that the power supply is capable of sustaining without exceeding the power or current limit of the power mesh is dependent upon the output voltage of the power supply. For an auto-ranging power supply having a full power rating ($P_F$), e.g., 100 watts, capable of full power output from a lower voltage $V_{LK}$ (e.g., 10 volts) to a higher voltage $V_{MAX}$ (e.g., 50 volts), the maximum current available during programming of the power supply is greater than the static rating of the power supply at every operating point along the boundary, except right at the lower knee in FIG. 3. This is because at voltages below the lower knee, a resistive load draws less current than maximum at all points until the voltage reaches the voltage $V_{LK}$ at the lower knee. For any point above the lower knee, the output current available is higher than the final current based on a resistive load assumption because of the auto-ranging characteristic of the power boundary. It may be desirable to allow for even greater amounts of maximum power to be delivered, allowing even faster programming response times for a given power output boundary.

The slew rate is calculated differently in each of three operating regions. Two of the three regions converge, and are equal, at a lower locus point of operation, e.g., at $V_{LK}$ (e.g., 10 volts) and $I_{MAX}$ (e.g., 10 amps). At the lower locus point the available current is $I_{MAX}$ (e.g. 10 amps), and the available power is $P_F$ (e.g., 100 watts). In this illustrative example, the output power results in the same 10 amps that the current limit dictates, ensuring a seamless transition between the slew rates of the two regions. The allowable slew rate from zero volts to $V_{LK}$ is a simple exponential charge, formed by a time constant created by the maximum resistive load of $R_M$ ($V_{LK}$ divided by $I_{MAX}$) and an output capacitance $C_{OUT}$.

For purposes of an illustration, the power supply will be considered as having a simplified equivalent circuit as shown in FIG. 7, where a current source DC provides a charging current $I_M$. An output capacitance $C_{OUT}$ will be assumed to be 50 μF, $V_{LK}$ will be assumed to be 10 volts, and $I_M$ will be assumed to be 10 amps, so that $R_M$ as shown is 1 ohm. At zero volts, all the available current goes into the output capacitance $C_{OUT}$. As the voltage across the capacitance $C_{OUT}$ rises, an increasing amount of the total current goes into the load resistance $R_M$. An equation of the voltage in the region between zero volts and $V_{LK}$ (e.g., 10 volts) is shown in FIG. 4, where: V(t) is an instantaneous value of the voltage, $V_S$ is a starting value of the voltage, $V_F$ is a final value of the voltage, t is time; τ1 is a time constant defined as shown in FIG. 8; $V_S<V_{LK}$; and $V_F<V_{LK}$, where is as shown in FIG. 3.

The allowable slew rate from $V_1$ (e.g., 10 volts) to the maximum rating $V_2$ (e.g., 50 volts) is a more complex equation that takes into account the continuous reduction in available charging current as the output voltage increases, due to the need to keep the total power below the maximum rating $P_F$ (100 watts in the above illustration). This equation is to be used when the final voltage $V_F$ is greater than $V_{LK}$, and the present voltage, $V_{PV}$, is less than $V_{LK}$.

There is also an assumption that the load resistance, $R_M$, which should be used for calculating the time constant, and the impact on load current draw as the output increases, should be set to draw the maximum current at the final set voltage or the maximum available power for voltages greater than $V_{LK}$. This creates a third equation. The third equation, shown in FIG. 5, which applies below the lower power boundary of 10 volts, assumes a constant current of 10 amps, which is the maximum amount of current available for all voltages less than $V_{LK}$. The form of the equation is a simple exponential, with a variable time constant depending on the value of R used. The value of R is based on the final value, as described above. In the equation shown in FIG. 5, V(t) is an instantaneous value of the voltage, $V_S$ is a starting value of the voltage, $V_F$ is a final value of the voltage, t is time; τ2 is a time constant defined as shown in FIG. 9; and $V_S<V_{LK}$.

If the value of the present voltage is above the lower power boundary limit of 10 volts, the available current to charge the output decreases along a hyperbolic curve of constant power. When this current is applied to the RC circuit shown in FIG. 7, a complex equation, shown in FIG. 6, that is the square root of an exponential results. In the equation shown in FIG. 6, V(t) is an instantaneous value of the voltage, $V_S$ is a starting value of the voltage, $V_F$ is a final value of the voltage, t is time; τ3 is a time constant defined as shown in FIG. 10; and $V_S>V_{LK}$ or $V(t)>V_{LK}$, where $V_{LK}$ is as shown in FIG. 3.

Figure 12:
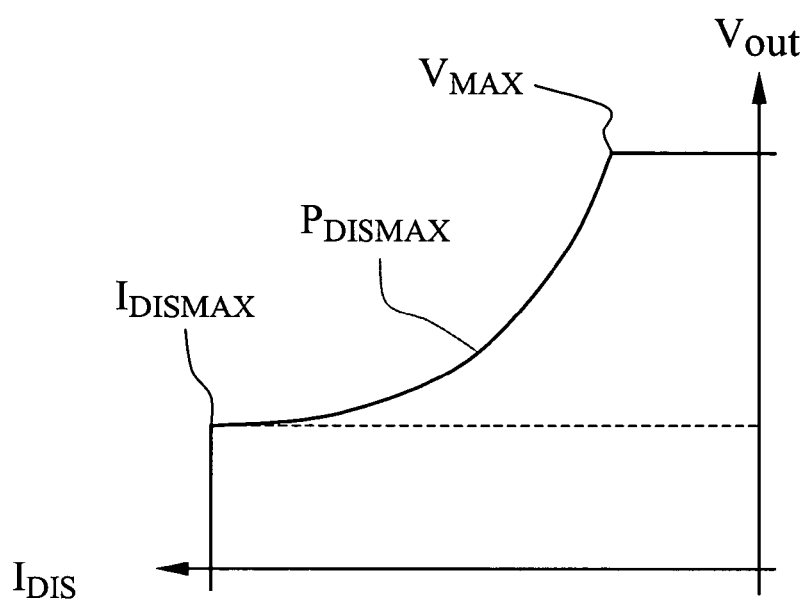
FIG. 12 is a graphic representation of power dissipated by the down programmer of the power supply shown in FIG. 1.

If the output is slewing downward, the first assumption is that there is no load resistance. This is because the slowest (worst case) down programming time is when there is no additional load to increase the rate of discharge of the output capacitor. The discharge of the output capacitor is accomplished by a dissipative load configured as a constant power discharge. The amount of current drawn by the dissipative load increases as the output voltage decreases. The rate of change of the output programming signal is controlled to keep the system from trying to exceed the maximum power Pm the dissipative load is capable of dissipating, preventing overshoots as the constant voltage loop loses control of the systems and saturates. For the purposes of this example that power will be assumed to be 15 watts. The equation for the voltage as a function of time is shown in FIG. 11 where V(t) is an instantaneous value, $V_i$ is an initial value of the output voltage, $P_m$ is the maximum power capability of the discharge load, and $C_{out}$ is a value of the output capacitance 15. The locus of constant power must be limited below some voltage in order to prevent the current being drawn by the down programmer from exceed some limit, preventing destruction of the circuit. The operating boundary is shown in FIG. 12. The maximum discharge current is $I_{DISMAX}$, and the curve is a simple constant power curve where $I_{DIS}*V_{out}=P_{DISMAX}$.

The slew rate controller 20 controls the slew rate by dividing the output programming in small time slices of equal interval, and changes the output voltage a small amount during each time interval. A large signal approximation of the result has the desired slew rate. If the actual waveform is examined closely, the waveform will have small steps in voltage equal to the programmed changes in each interval, as shown in FIG. 13.

Figure 13:
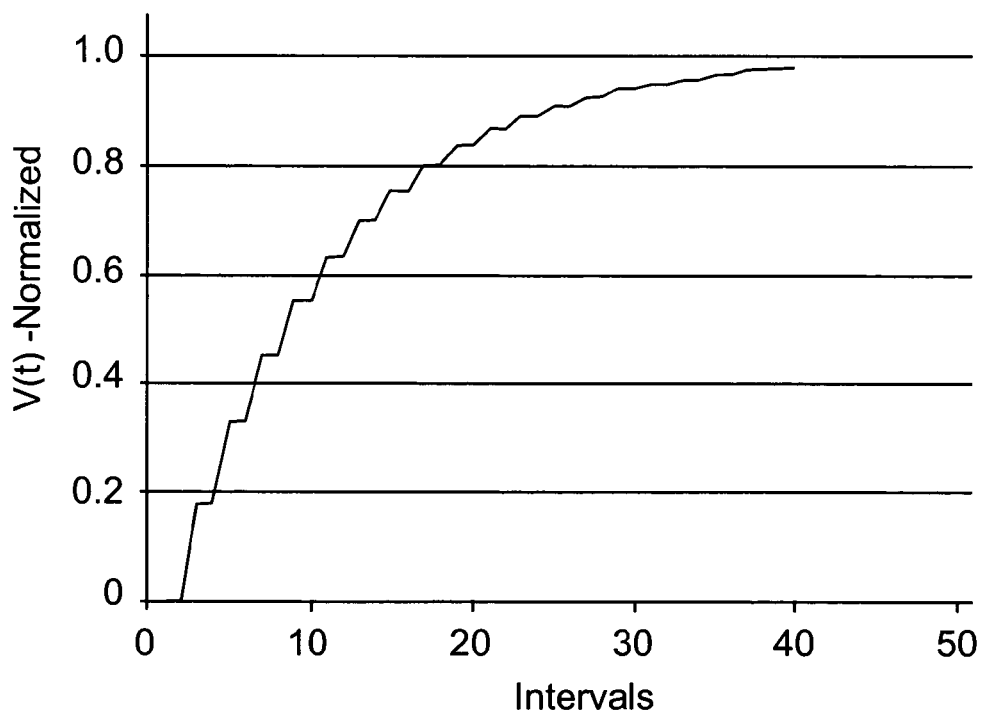
FIG. 13 is a graph showing a normalized voltage response of the output of the slew rate controller shown in FIG. 2.
Figure 14:
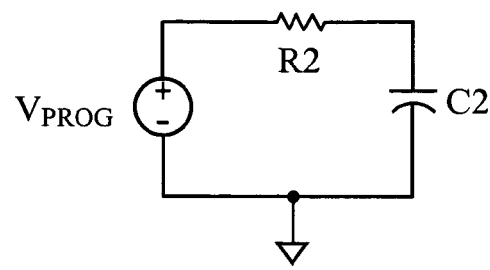
FIG. 14 is a simplified schematic diagram of a filter useable to smooth the voltage steps shown in FIG. 13.
Figure 15:
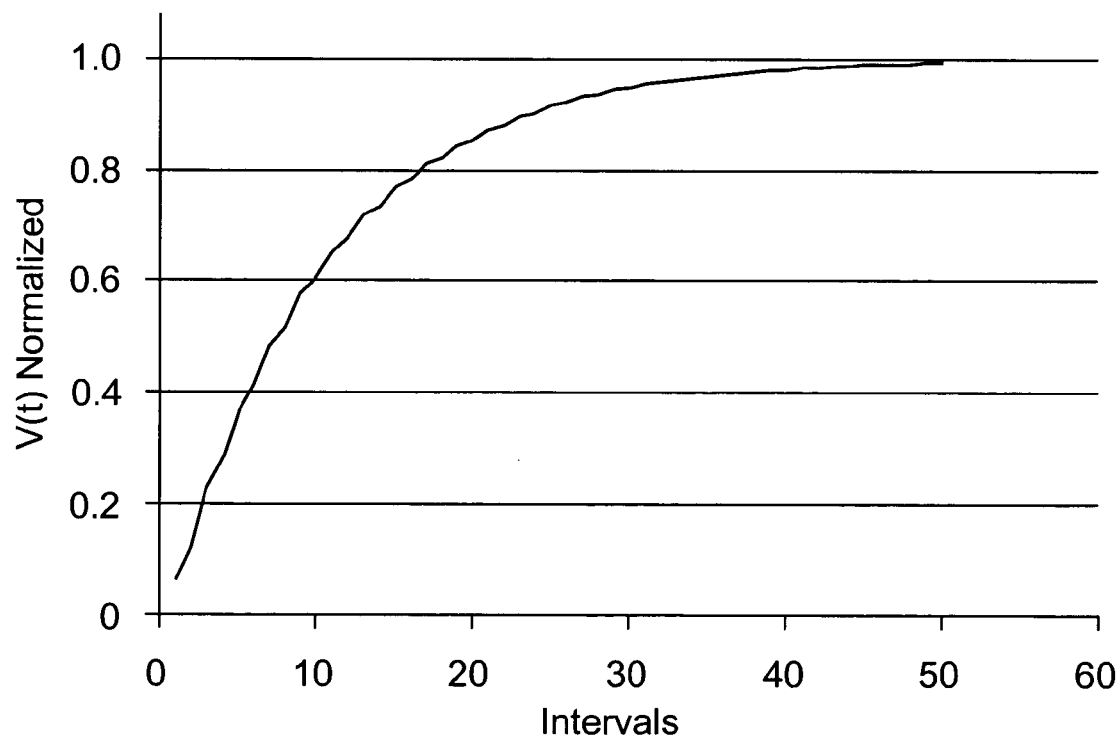
FIG. 15 is a graph showing a filtered normalized voltage response of the output of the slew rate controller shown in FIG. 2 using the filter shown in FIG. 14.

The low pass filter 19 shown in FIG. 1 may comprise a simple RC network, (R2C2) such as shown in FIG. 14, which helps to smooth the steps shown in FIG. 13 to an acceptably small level as shown in FIG. 15. In FIG. 14, $V_{PROG}$ represents the output of the DAC 13 shown in FIG. 1.

Provided that the resolution of the Digital to Analog Converter (DAC) is high (large number of bits of resolution) and the time interval is kept short, the steps are easily filtered out with minimal impact on the net slew rate. In the case of the present embodiment, the time interval is 900 ns, and the DAC is a 16 bit converter, which has 65536 possible setting steps. A 10 μs filter may be used on the output of the DAC. Further, the output circuit 12 into which the filtered DAC output is passed does not have infinite bandwidth, which also filters the output of the DAC. In the case of the present embodiment, the power supply bandwidth is equivalent to an 8 μs time constant low pass filter.

A process of generating the slew values uses the slew rate controller 20 and indexes a table at the fixed time interval described above. The table index is derived from three pieces of information, the present value (PV), the final value (FV), and the programming direction, which is described as FV>PV. If the signal FV>PV is TRUE, the output is programming up, and the values are derived from the equations in FIGS. 4, 5 and 6. If the signal FV>PV is FALSE, the output is programming down, and the values are derived from FIG. 11.

For a typical system of this type, it is possible to require a very large table of values. For a 16 bit programmable system, both the present value and final value are 16 bit values. Added to the direction signal, FV>PV, this results in $2^{33}$ possible table entry values. For maximum flexibility, it is also desirable to allow each entry in the table to be at least 16 bits. This implies a memory of $2^{37}$ bits, which is a 137 gigabit memory. Such a large memory would be prohibitively expensive.

Putting further pressure on this problem is a need to slew at rates slower than 1 bit per time interval. If any element of the table has a value equal to "0", the slewing process will come to a halt if that index point is ever reached. Thus, the basic system would be limited to a minimum slew rate of 1 bit per time interval. This limitation can be addressed by using fractional bits in the table. The values in the table are binary fixed point values, with bits above and below the binary point. The values can then assume settings at values less than "1" without causing the table to halt when the lower values are reached. It also allows the slew rate controller 20 to update the DAC at non-equal intervals, and to have more precise slopes.

Unfortunately, using fractional bits puts further pressure on the size of the memory that it would seem is required to hold all the information. Simple compromises may be implemented to reduce the memory size to a manageable amount. First, the present value and final value indexes can be truncated with minimal impact on the accuracy of the system. This is implemented by only using the upper bits of the two values as indexes into the memory table. The present implementation uses 4 bits for each of the two inputs. This has the impact of reducing the memory requirements from $2^{37}$ plus any fractional bits, to $2^{14}$ plus any fractional bits, which is only 16K bits. Another compromise is to limit the maximum slew rate at any step to less than the full 16 bit offset. The unused bits can be used to hold the fractional bits. In the present embodiment, there are 8 bits above the binary point and 8 bits below the binary point. Since each bit above the binary point represents $50*1/(2^{16})/900$ ns=847 v/s, a maximum setting of 255 ($2^8-1$) would achieve a slew rate of 216 v/ms. In exchange, the minimum slew rate is extended downward from the same 847 v/s to 3.3 v/s (exactly 256 times lower).

The tradeoff of reducing index resolution results in slightly less smooth slew rates, since the table has to generate a value which is slightly higher or lower than the ideal for that point on the transition. In measured results, it has been found to cause the net total current to be less than 2% off what an ideal design with excessive memory requirements would have. By reducing the maximum current by this same factor, and the slew tables values accordingly, the slew rate is reduced by that same 2%, but the system is realizable at low cost.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A power supply, comprising:
a power converter which converts input power to a DC power;
an output circuit which controls the DC power applied to a load in response to a drive voltage; and
a digitally implemented slew rate controller which regulates a slew rate of a voltage of the DC power by changing a present value of the drive voltage supplied to the output circuit by incremental values at predetermined intervals to arrive at a final value of the drive voltage, wherein:
each incremental value is selected from a plurality of different incremental values so that a maximum output current rating and a maximum output power rating of the output circuit are not exceeded at any value of the drive voltage while slewing the voltage of the DC power from the present value to the final value.

2. A power supply comprising:
a power converter which converts input power to a DC power;
an output circuit which controls the DC power applied to a load in response to a drive voltage; and
a digitally implemented slew rate controller which regulates a slew rate of a voltage of the DC power by changing a present value of the drive voltage supplied to the output circuit by incremental values at predetermined intervals to arrive at a final value of the drive voltage so that a maximum output current rating and a maximum output power rating of the output circuit are not exceeded at any value of the drive voltage while slewing the voltage of the DC power from the present value to the final value, wherein:
the slew rate controller comprises:
a slope look-up table which stores the incremental values and which is indexed to be accessed according to the present value, the final value and a change direction of the drive voltage.

3. The power supply of claim 2, wherein the slew rate controller further comprises:
an input latch which latches the final value of the drive voltage input from an external source;
a first magnitude comparator which compares the final value with the present value to determine the change direction of the drive voltage;
an accumulator which sums the present value and one of the stored incremental values selected from the look-up table based on the present value, the final value and the direction of change of the drive voltage and outputs a next value of the drive voltage; and
an output latch which latches the next value as a new present value.

4. The power supply of claim 3, the slew rate controller further comprises:
a clipper which limits the next value to a predetermined maximum.

5. The power supply of claim 3, the slew rate controller further comprises:
a multiplexer which selects one of the next value and the final value and outputs the selected value to the output latch in response to a bypass control signal.

6. The power supply of claim 5, wherein:
the first magnitude comparator determines whether the final value equals the present value, the final value is greater than the present value or the final value is less than the present value; and
the slew rate controller further comprises:
a second magnitude comparator which compares the next, value with the final value and determines whether the next value is less than the final value or greater than the final value, and
a bypass logic circuit which generates the bypass control signal so that the multiplexer selects the final value where the final value equals the present value, or the final value is greater than the present value and the next value is greater than the final value, or the final value is less than the present value and the next value is less than the final value.

7. The power supply of claim 6, wherein the bypass logic circuit generates the bypass control signal in response to an external command regardless of the values of the present value and the, next value.

8. The power supply of claim 3, wherein the slew rate controller further comprises:
a slew latch which latches a value of a programmed slew value input from the external source;
a second magnitude comparator which compares the selected incremental value from the look-up table and the latched slew value; and
a multiplexer which provides the selected incremental value to the accumulator or replaces the selected incremental value with the latched slew value based oh the comparison.

9. The power supply of claim 8, wherein, the multiplexer replaces the selected incremental value with the latched slew value if the latched slew value is less than the value selected from the slew rate table.

10. The power supply of claim 2, wherein each predetermined interval is an interval of a clock.

11. A digitally implemented slew rate controller for regulating a slew rate of a drive voltage of an electronic circuit, the slew rate controller comprising:
a slope look-up table which stores the incremental values and which is indexed to be accessed according to a present value, a final value and a change direction of the drive voltage.
an input latch which latches the final value of the drive voltage input from an external source;
a first magnitude comparator which compares the final value with the present value to determine the change direction of the drive voltage;
an accumulator which sums the present value and one of the stored incremental values selected from the look-up table based on the present value, the final value and the direction of change of the drive voltage and outputs a next value of the drive voltage; and
an output latch which latches the next value as a new present value.

12. The slew rate controller of claim 11, further comprising:
a clipper which limits the next value to a predetermined maximum.

13. The slew rate controller of claim 11, the slew rate controller further comprises:
a multiplexer which selects one of the next value and the final value and outputs the selected value to the output latch in response to a bypass control signal.

14. The slew rate controller of claim 13, wherein:
the first magnitude comparator determines whether the final value equals the present value, the final value is greater than the present value or the final value is less than the present value; and
the slew rate controller further comprises;
  a second magnitude comparator which compares the next value with the final value and determines whether the next value is less than the final value or greater than the final value, and
  a bypass logic circuit which generates the bypass control signal so that the multiplexer selects the final value where the final value equals the present value, or the final value is greater than the present value and the next value is greater than the final value, or the final value is less than the present value and the next value is less than the final value.

15. The slew rate controller of claim 14, wherein the bypass logic circuit generates the bypass control signal in response to an external command regardless of the values of the present value and the next value.

16. The slew rate controller of claim 11, wherein the slew rate controller further comprises:
  a slew latch which latches a value of a programmed slew value input from the external source;
  a second magnitude comparator which compares the selected incremental value from the look-up table and the latched slew value; and
  a multiplexer which provides the selected incremental value to the accumulator or replaces the selected incremental value with the latched slew value based on the comparison.

17. The slew rate controller of claim 16, wherein, the multiplexer replaces the selected incremental value with the latched slew value if the latched slew value is less than the value selected from the slew rate table.

18. The slew rate controller of claim 11, wherein each predetermined interval is an interval of a clock.

19. A method of digitally controlling slew rate in a power supply, comprising:
  providing a look-up table comprising values by which an output voltage of the power supply may be incremented without exceeding a maximum output current rating and a maximum output power rating of the power supply and which is indexed for accessing according to a present value, a final value and a direction of change of an output voltage of the power supply;
  inputting a final value to which the output voltage is to be changed;
  comparing the final value with the present value of the output voltage;
  selecting one of the incremental values based on the present value, the final value and the direction of change of the output voltage;
  summing the selected incremental value and the present value to obtain a next value;
  latching the next value as a new present value;
  stopping the incrementing of the output voltage based on comparing the next value with the final value and the comparing of the final value with the present value.

20. The method of claim 19, wherein the stopping of the incrementing comprises:
  stopping the incrementing where the final value equals the present value, or the final value is greater than the present value and the next value is greater than the final value, or the final value is less than the present value and the next value is less than the final value.

* * * * *